US011331837B2

(12) United States Patent
Yoon (10) Patent No.: US 11,331,837 B2
(45) Date of Patent: May 17, 2022

(54) APPARATUS AND METHOD FOR FORMING INTERIOR MATERIAL OF VEHICLE

(71) Applicant: SEOYON E-HWA CO., LTD., Seoul (KR)

(72) Inventor: Chi Won Yoon, Cheonan-si (KR)

(73) Assignee: SEOYON E-HWA CO., LTD., Seoul (KR)

( * ) Notice: Subject to any disclaimer, the term of this patent is extended or adjusted under 35 U.S.C. 154(b) by 376 days.

(21) Appl. No.: 16/385,517

(22) Filed: Apr. 16, 2019

(65) Prior Publication Data
US 2019/0322024 A1 Oct. 24, 2019

(30) Foreign Application Priority Data
Apr. 24, 2018 (KR) .................. 10-2018-0047092

(51) Int. Cl.
| | |
|---|---|
| *B29C 45/42* | (2006.01) |
| *B29C 45/66* | (2006.01) |
| *B29C 45/14* | (2006.01) |
| *B29C 45/26* | (2006.01) |
| *B29L 31/30* | (2006.01) |

(52) U.S. Cl.
CPC ........ *B29C 45/66* (2013.01); *B29C 45/14336* (2013.01); *B29C 45/26* (2013.01); *B29K 2713/00* (2013.01); *B29L 2031/3005* (2013.01)

(58) Field of Classification Search
CPC ........ B29C 45/00; B29C 45/03; B29C 45/17; B29C 45/1742; B29C 45/26; B29C 45/28; B29C 45/52; B29C 45/522; B29C 45/5645
See application file for complete search history.

(56) References Cited

U.S. PATENT DOCUMENTS

| | | | |
|---|---|---|---|
| 2001/0010412 A1 | 8/2001 | Klotz | |
| 2005/0121818 A1 | 6/2005 | Cowelchuk et al. | |
| 2008/0093756 A1* | 4/2008 | Nishimoto | .......... B29C 45/7653 |
| | | | 264/2.3 |
| 2009/0168313 A1* | 7/2009 | Wei | .......... B29C 45/27 |
| | | | 264/328.8 |

(Continued)

FOREIGN PATENT DOCUMENTS

| | | |
|---|---|---|
| CN | 204414430 | 6/2015 |
| CN | 106493908 | 3/2017 |

(Continued)

OTHER PUBLICATIONS

Chinese Office Action—Chinese Application No. 201910302504.1 dated Nov. 19, 2020, citing CN204414430, CN106493908, US2005121818, and WO2007040797.

(Continued)

*Primary Examiner* — Joseph S Del Sole
*Assistant Examiner* — Thu Khanh T Nguyen
(74) *Attorney, Agent, or Firm* — Cantor Colburn LLP (57) ABSTRACT

Provided are an apparatus and a method for forming interior material of a vehicle, in which when a resin is injected onto a rear surface of fabric through a fixed mold while a moving mold, onto which the fabric is placed, is pressed against the fixed mold and then a core mold of the moving mold is pulled back by a decompression releasing distance, a capacity increases by as much as the distance such that a pressure and a temperature are reduced so as to minimize damage to the fabric.

7 Claims, 6 Drawing Sheets

(56) References Cited

U.S. PATENT DOCUMENTS

2010/0155992 A1\* 6/2010 Kurashima ............. B29C 45/56
264/272.14

FOREIGN PATENT DOCUMENTS

| DE | 69113888 | | 4/1996 |
|----|----------|---|--------|
| DE | 69816531 | | 7/2004 |
| JP | 2008041846 A | \* | 2/2008 |
| KR | 20110060061 | | 6/2011 |
| WO | 2007040797 | | 4/2007 |

OTHER PUBLICATIONS

German Office Action—German Application No. 10 2019 110 300.2 dated Jan. 12, 2021, citing DE 691 13 888, US 2009/0168313, US 2001/0010412, and DE 698 16 531.

\* cited by examiner

*Prior Art*

*Prior Art*

*Prior Art*

APPARATUS AND METHOD FOR FORMING INTERIOR MATERIAL OF VEHICLE

BACKGROUND

1. Technical Field

The present invention relates to an apparatus and a method for forming interior material of a vehicle, in which when a resin is injected onto a rear surface of fabric through a fixed mold while a moving mold, onto which the fabric is placed, is pressed against the fixed mold and then a core mold of the moving mold is pulled back by a decompression releasing distance, a capacity increases by as much as the distance such that a pressure and a temperature are reduced so as to minimize damage to the fabric.

2. Description of Related Art

A conventional apparatus and method for forming interior material of a vehicle, which is a molded product including fabric and an injection material, are provided as shown in FIGS. 5A to 5D.

In the apparatus and method shown in FIGS. 5A to 5D, fabric 2 placed on a first mold 1 as an insert and an injection material 4 inserted in a second mold 3 are inserted as shown in FIG. 5A.

As a method of placing and fixing the fabric 2, a variety of methods using a pin, vacuum, clamp, and the like may be employed.

Also, a pre-forming process is used when the fabric 2 being placed has a drawn shape as shown in FIG. 5A. A pre-forming process is not used when the fabric 2 has a shape close to a flat surface.

An adhesive is applied to a surface of the inserted injection material 4 using an adhesive spray 5 as shown in FIG. 5B.

After the adhesive is applied, when the first mold 1 is pressed against the second mold 3, the fabric 2 and the injection material 4 are pressed against each other and bonded together.

When pressing is completed, the first mold 1 is released from the second mold 3 as shown in FIG. 5D and a molded product is withdrawn.

Since the insertion and adhesive-pressing method discharges materials such as volatile organic compounds (VOCs) which are harmful to a human body, it is inadequate for interior material of a vehicle, and more particularly, interior material for luxury cars.

To solve the problem, a conventional apparatus and method for forming interior material of a vehicle are provided as shown in FIGS. 6A to 6D.

Figure 6:
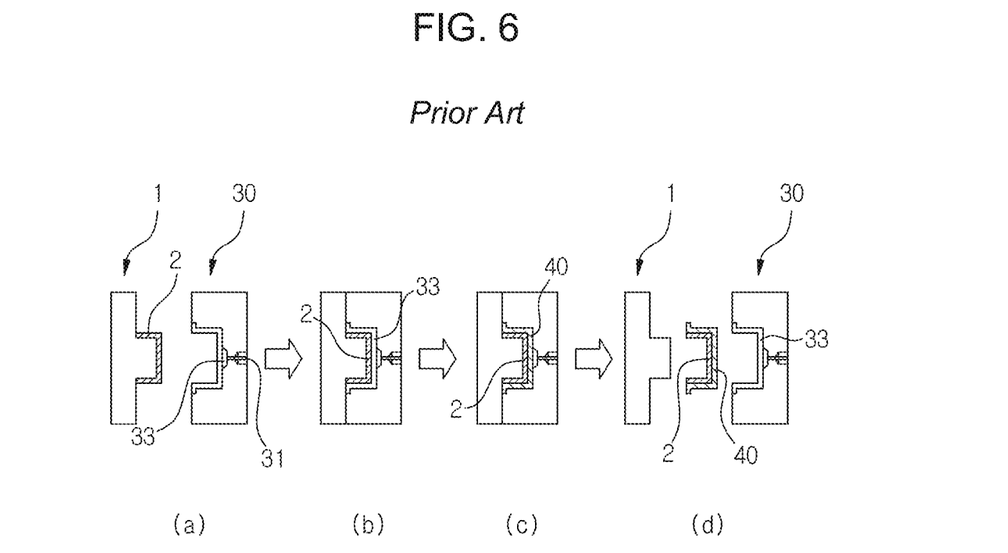
FIG. 6 is schematic process drawings illustrating another conventional apparatus and method of forming interior material of a vehicle.

In the apparatus and method shown in FIGS. 6A to 6D, a fabric 2 is placed on a first mold 1 as an insert as shown in FIG. 6A.

As a method of placing and fixing the fabric 2, like those of FIGS. 5A to 5D, a variety of methods using a pin, vacuum, clamp, and the like may be employed.

Also, a pre-forming process is used when the fabric 2 being placed has a drawn shape as shown in FIG. 6A. A pre-forming process is not used when the fabric 2 has a shape close to a flat surface.

The first mold 1, on which the fabric 2 is placed, and a second mold 30, in which a cavity 33 is formed, come into close contact with each other as shown in FIG. 6B.

In a pressed state, a resin is injected into a resin inlet 31 of the second mold 30 and the cavity 33 is filled with the resin as shown in FIG. 6C.

Then, a resin 40 of the cavity 33 is integrally formed with a rear surface of the fabric 2.

When injection molding is completed, the first mold 1 is released from the second mold 30 as shown in FIG. 6D, and a molded product is withdrawn.

Figure 7:
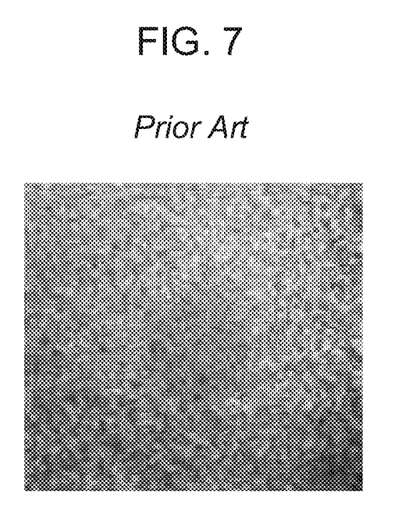
FIG. 7 is a photo illustrating a damaged part of fabric in a molded product of FIG. 6.

However, when injection is performed in the pressed state, since the resin is applied to the rear surface of the fabric with high pressure, a protruding core of the first mold 1 pushes the surface of the fabric 2 such that damage (a glittering phenomenon) occurs to the surface as shown in FIG. 7.

RELATED ART DOCUMENT

Patent Document (Patent Document 1) Korean Patent Publication No. 10-2011-0060061

SUMMARY

1. Technical Problem

A technical objective of the present invention is directed to providing an apparatus and a method for forming interior material of a vehicle, which is capable of integrally forming fabric and an injection material without damage to a surface of the fabric.

2. Solutions to Problem

An apparatus for forming interior material of a vehicle includes a fixed mold; a dividable moving mold including a first moving mold, in which a core mold, onto which fabric (woven fabric or non-woven fabric) is placed as an insert, is slidably installed, and including a second moving mold which faces the first moving mold; a core mold rod whose one end is fixed to the second moving mold and other end is fixed to the core mold; a decompression releasing elastic member installed between the first moving mold and the second moving mold; and a puller rod whose one end is fixed to the second moving mold and other end is disposed in a groove formed in the fixed mold, wherein the decompression releasing elastic member pulls the core mold back by a decompression releasing distance by which the second moving mold is pushed away from the first moving mold which is pressed against the fixed mold.

In the apparatus according to the present invention, a decompression releasing distance stopper, which restricts the decompression releasing distance of the second moving mold from the first moving mold, is further installed.

In the apparatus according to the present invention, the decompression releasing distance stopper includes a bolt installed in the first moving mold and a bolt sliding groove formed in the second moving mold, and wherein a shaft portion of the bolt is fastened and fixed to the first moving mold, and a stepped head of the bolt is held by a holding lip of the bolt sliding groove while being disposed in the bolt sliding groove.

In the apparatus according to the present invention, the second moving mold includes a second moving mold a, which faces the first moving mold, and a second moving mold b which faces the second moving mold a, wherein the one end of the core mold rod is fixed to the second moving mold a, wherein the one end of the puller rod is fixed to the second moving mold b, and wherein the decompression releasing elastic member and the decompression releasing distance stopper are installed between the first moving mold and the second moving mold a.

In the apparatus according to the present invention, a pressing maintenance member, which maintains pressure between the first moving mold and the fixed mold, is further installed.

In the apparatus according to the present invention, the close contact maintenance member is a close contact maintenance holding member which includes a protruding bar having a holding groove formed in the first moving mold and which includes a held protrusion formed around the groove of the fixed mold to be held by the holding groove when the protruding bar is inserted into the groove of the fixed mold, and a holding force of the close contact maintenance holding member is less than a withdrawal force of the first moving mold.

In the apparatus according to the present invention, the close contact maintenance member is a close contact maintenance elastic member which is installed between the first moving mold and the second moving mold b.

A method of forming interior material of a vehicle includes placing fabric (woven fabric or non-woven fabric) as an insert onto a core mold which is slidably installed in a first moving mold which faces a second moving mold; allowing the first moving mold to come into close contact with a fixed mold; injecting a resin through the fixed mold to be integrated with a rear surface of the fabric while the close contact is maintained; pulling the core mold back by a decompression releasing distance in which the second moving mold is elastically pushed away from the first moving mold in a pressed state when the injection is completed; and releasing the first moving mold from the fixed mold and withdrawing a molded product when the fabric and an injection material are integrally formed.

A method of forming interior material of a vehicle includes placing fabric (woven fabric or non-woven fabric) onto a core mold which is slidably installed in a first moving mold among the first moving mold, a second moving mold a, and a second moving mold b, which are arranged in series; allowing the first moving mold to come into close contact with a fixed mold; injecting a resin through the fixed mold to be integrated with a rear surface of the fabric while the close contact is maintained; pulling the core mold back by a decompression releasing distance in which the second moving mold a is elastically pushed from the first moving mold in a pressed state and then additionally releasing the second moving mold b when the injection is completed; and releasing the first moving mold from the fixed mold and withdrawing a molded product when the fabric and an injection material are integrally formed.

3. Advantageous Effects

According to the present invention, there are present advantages as follows.

Since a pressure and a temperature decrease as much as a capacity of a decompression releasing distance in which a core mold surrounding fabric retreats, damage to the fabric is minimized such that a high quality product is mass-produced, volatile organic compounds (VOCs) are reduced by using no adhesives, and an adhesive-applying process is reduced.

Since there is no connecting tool which connects a second moving mold a to a second moving mold b, an additional retreat is performed after a retreat by as much as the decompression releasing distance so as to minimize spreading of an injection machine to obtain excellent quality.

Since a decompression releasing distance stopper is disposed between the first moving mold and the second moving mold a, even when the decompression releasing distance (retreat distance) of the core mold is freely disposed, it is easy to control the decompression releasing distance to be desirable by changing a bolt of the decompression releasing distance stopper or variously changing a length of the bolt according to a fastening amount such that it is possible to freely adjust the decompression releasing distance according to a molded product.

A close contact maintenance member, which maintains a pressed state between the first moving mold and a fixed mold, is further installed such that an excellent molded product may be produced by preventing an arbitrary retreat (undesirable retreat) of the first moving mold which is caused by the retreat of the core mold.

DESCRIPTION OF REFERENCE NUMERALS

110: dividable moving mold
111: first moving mold
113: second moving mold
114, 115: second moving mold a, second moving mold b
120: core mold
125: core mold rod
130: fixed mold
140: decompression releasing elastic member
150: puller rod
160: decompression releasing distance stopper
170: close contact maintenance holding member

DETAILED DESCRIPTION OF EMBODIMENTS

Hereinafter, exemplary embodiments of the present invention will be described with reference to the attached drawings. Here, the same portions as those of a conventional technique will be referred to as conventional symbols and a detailed description thereof will be omitted.

First Embodiment

Figure 1:
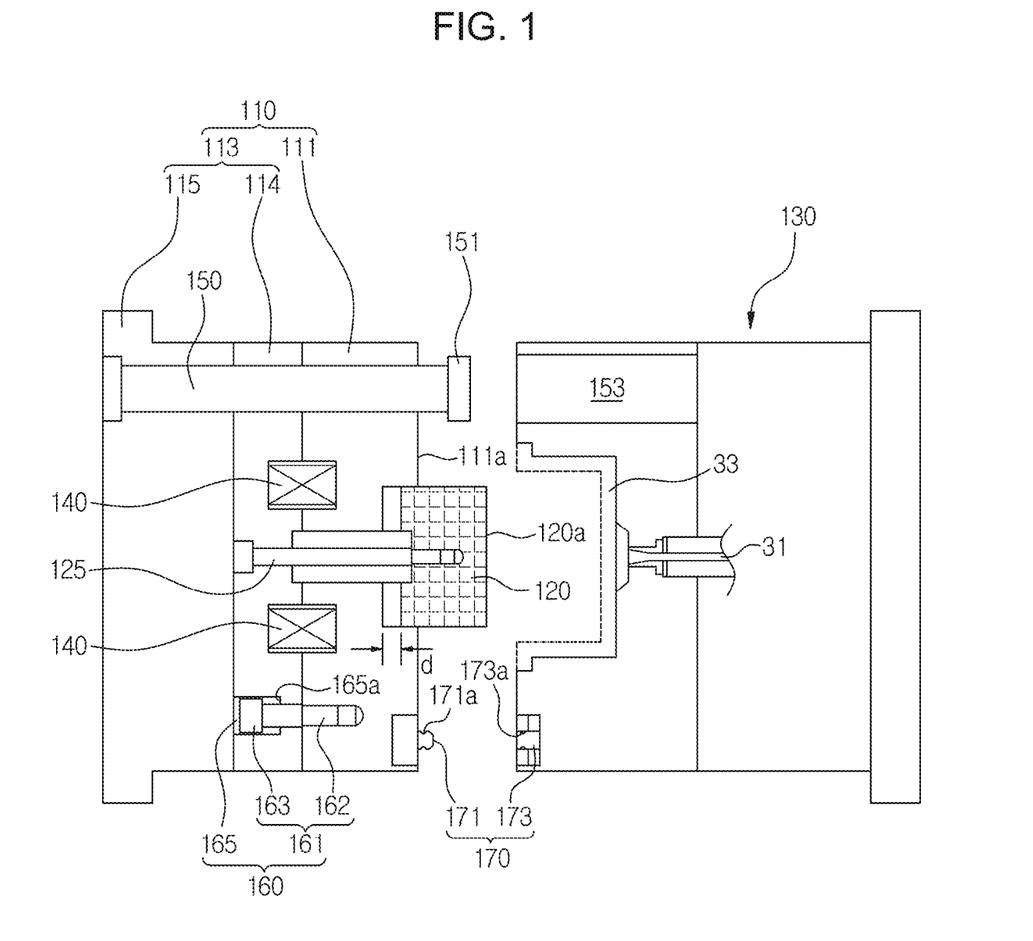
FIG. 1 is a schematic cross-sectional view of an apparatus for forming interior material of a vehicle according to a first embodiment of the present invention.

FIG. 1 is a schematic cross-sectional view of an apparatus for forming interior material of a vehicle according to a first embodiment of the present invention, and FIGS. 2A to 2F are schematic process drawings illustrating a method of forming interior material of a vehicle using the apparatus of FIG. 1.

The apparatus for forming interior material of a vehicle according to the first embodiment of the present invention, as shown in FIG. 1, includes a fixed mold 130, a dividable moving mold 110 including a first moving mold 111, in which a core mold 120 onto which fabric (woven fabric or non-woven fabric) 20 is placed as an insert is slidably installed, and a second moving mold 113 facing the first moving mold 111, a core mold rod 125 whose one end is fixed to the second moving mold 113 and other end is fixed to the core mold 120, a decompression releasing elastic member 140 installed between the first moving mold 111 and the second moving mold 113, and a puller rod 150 whose one end is fixed to the second moving mold 113 and other end is disposed in a groove 153 formed in the fixed mold 130.

When the first moving mold 111 is pressed against the fixed mold 130, a mold cavity 33 is formed between the core mold 120 which is a male mold and the fixed mold 130 which is a female mold.

The core mold 120 is a male mold of the first moving mold 111 and protrudes from an end face 111a of the first moving mold 111.

That is, an end face 120a of the core mold 120 protrudes forward from the end face 111a of the first moving mold 111.

Also, the fabric 20 is placed as an insert onto an entirety of a perimeter of the core mold 120, which protrude as described above, or onto only the end face 120a.

Also, the core mold 120 is disposed and installed to be movable backward, by a decompression releasing distance d, from the first moving mold 111.

That is, a space is formed in a rear side of the core mold 120 due to retreat by the decompression releasing distance d.

The core mold 120 is slidable due to the core mold rod 125.

The one end and the other end of the core mold rod 125 are fixed to the second moving mold 113 and the core mold 120, respectively.

The core mold rod 125 is also slidably disposed on the first moving mold 111.

The decompression releasing elastic member 140 allows the core mold 120 to retreat by the decompression opening distance d by which the second moving mold 113 is pushed away from the first moving mold 111 in close contact with the fixed mold 130.

The decompression releasing elastic member 140 is a spring installed in a groove formed in a plane where the first moving mold 111 and the second moving mold 113 face each other.

The puller rod 150 is slidably disposed in the groove 153 formed in the fixed mold 130 when the first moving mold 111 and the fixed mold 130 come into close contact with each other.

A flange 151 of the puller rod 150 retreats with the second moving mold 113 and is held by and pulls the end face 111a of the first moving mold 111 when the first moving mold 111 is completely released from the fixed mold 130.

Meanwhile, the decompression releasing distance d is a distance by which the core mold 120 retreats. Here, when it is necessary to retreat farther than the distance d, it is necessary to replace the first moving mold 111.

It is possible to solve the problem, without replacing the first moving mold 111, by using a decompression releasing distance stopper 160 from the beginning instead of forming the decompression releasing distance d to be large.

That is, the decompression releasing distance stopper 160 includes a bolt 161 installed on the first moving mold 111 and a bolt sliding groove 165 formed in the second moving mold 113.

The bolt 161 includes a shaft portion 162 and a stepped bolt head 163.

The shaft portion 162 is fastened and fixed to the second moving mold 113, and the stepped bolt head 163 is disposed in the bolt sliding groove 165.

A holding lip 165a is formed at an end of the bolt sliding groove 165.

Accordingly, a decompression releasing distance may be variously controlled by allowing the second moving mold 113 to be held when the second moving mold 113 retreats from the first moving mold 111 by a desirable decompression releasing distance d.

That is, a distance may be adjusted by replacing the bolt 161 with a variety of lengths or may be adjusted using a fastening amount of the bolt 161.

When the decompression releasing distance stopper 160 is present as described above, the decompression releasing distance stopper 160 controls a decompression releasing distance of the core mold 120.

Meanwhile, in order to control a deviation in a decompression releasing distance of an injection machine, the second moving mold 113 may be divided into a second moving mold a 114 and a second moving mold b 115.

In order to absorb a redundant decompression releasing distance when the injection machine pulls the dividable moving mold 110 back further than the decompression releasing distance, the second moving mold b 115 is minutely released in comparison to the second moving mold a 114. A minute releasing distance may be about 5 mm.

One end of the core mold rod 125 is fixed to the second moving mold a 114. One end of the puller rod 150 is fixed to the second moving mold b 115. The decompression releasing elastic member 140 and the decompression releasing distance stopper 160 are installed between the first moving mold 111 and the second moving mold a 114.

Meanwhile, a close contact maintenance member, which maintains close contact between the first moving mold 111 and the fixed mold 130 may be further installed.

The close contact maintenance member stably maintains the close contact between the first moving mold 111 and the fixed mold 130 when the core mold 120 retreats.

The close contact maintenance member is a close contact maintenance holding member 170, which includes a protruding bar 171 having a holding groove 171a formed in the first moving mold 111 and includes a held protrusion 173a formed around a groove 173 of the fixed mold 130 to be held by the holding groove 171a when the protruding bar 171 is inserted into the groove 173.

A holding force of the close contact maintenance holding member 170 is less than a withdrawal force of the first moving mold 111 (force of completely releasing the moving mold from the fixed mold).

Hereinafter, a method of forming interior material using the apparatus for forming interior material of a vehicle according to the first embodiment will be described with reference to FIGS. 2A to 2F.

Figure 2:
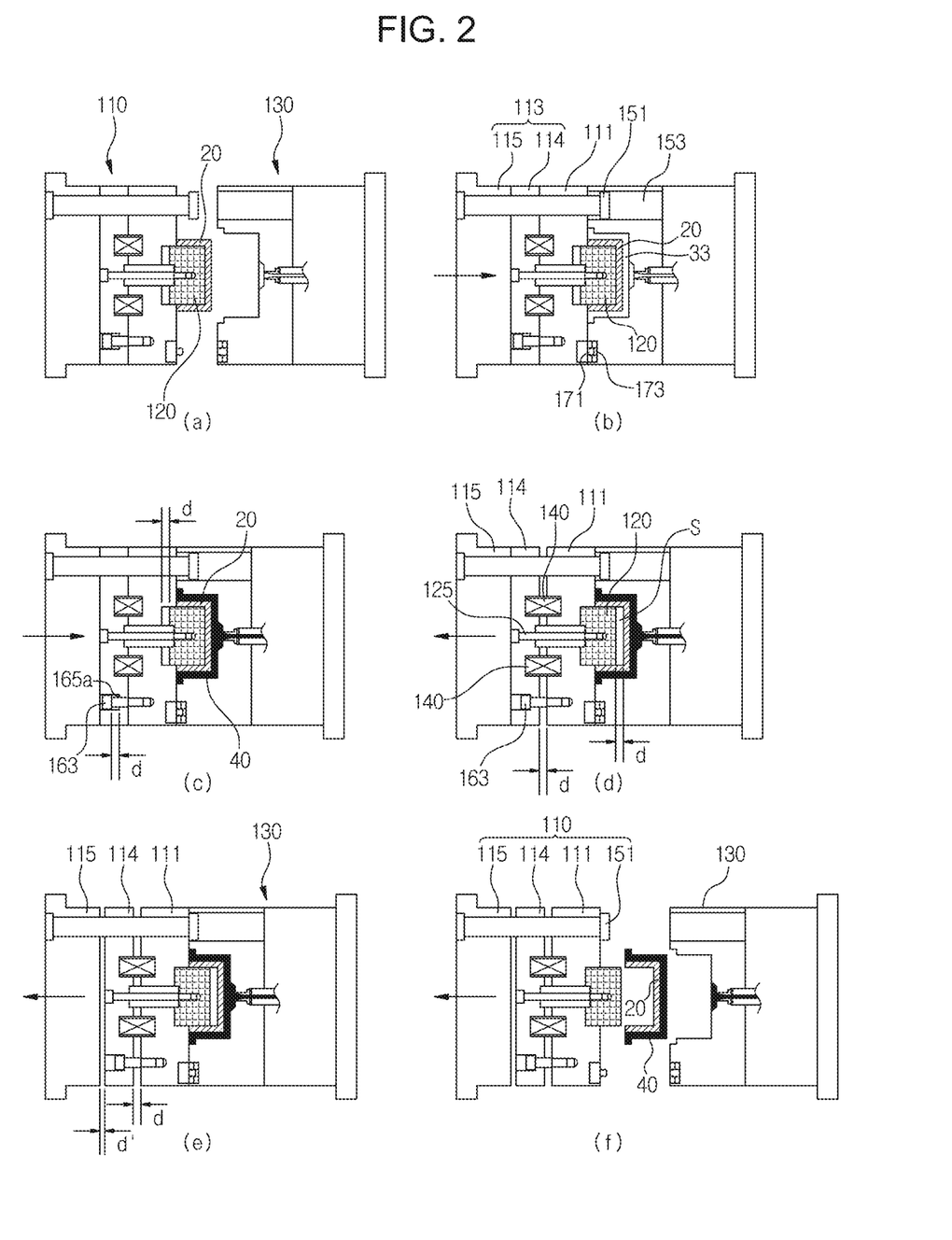
FIG. 2 is schematic process drawings illustrating a method of forming interior material of a vehicle using the apparatus of FIG. 1.

First, when the first moving mold 111 is released from the fixed mold 130 as shown in FIG. 2A, the fabric 20 is placed as an insert onto a perimeter of the core mold 120 of the first moving mold 111.

In the embodiment, the fabric 20 is a high-sensitivity felt including woven fabric and non-woven fabric.

In the case of the high-sensitivity felt, it is necessary to apply close-contact injection molding. This is because a pressure of injection in a pressed state is very high and only fabric can endure the pressure. When an existing epidermic material with napping or a foaming layer is injected in a pressed state, since the napping or the foaming layer cannot endure the pressure, the high-sensitivity felt is injected in a released state and then pressing-molded in a pressed state.

Also, the fabric 20 may be fixed by a variety of methods using a pin, vacuum, clamp, and the like.

A pre-forming process is used when the fabric 20, which is placed, has a deep-drawn shape, and a pre-forming process is not used when the fabric 20 has a shape close to a flat surface.

When the fabric 20 is placed as an insert onto the core mold 120 as shown in FIG. 2A, the dividable moving mold 110 and the fixed mold 130 come into close contact with each other as shown in FIG. 2B and preparation for injection is completed.

Here, as the protruding bar 171 of the first moving mold 111 is inserted into the groove 173 of the fixed mold 130, the holding groove 171*a* is mechanically held by the held protrusion 173*a*.

When the first moving mold 111 of the dividable moving mold 110 finishes pressing against the fixed mold 130 as shown in FIG. 2B, a cavity 33 is filled with a resin through a resin inlet 31 as shown in FIG. 2C.

When the cavity 33 is completely filled with the resin as shown in FIG. 2C, the core mold 120 retreats from the first moving mold 111 as shown in FIG. 2D in order to minimize an influence of the pressure of the fabric 20 and a temperature of the resin. Since only the core mold 120 retreats while the close contact between the first moving mold 111 and the fixed mold 130 is stably maintained by the close contact maintenance holding member 170, the injected resin does not leak from a part where the first moving mold 111 is pressed against the fixed mold 130.

The retreating of the core mold 120 is performed by the decompression releasing elastic member 140.

That is, the decompression releasing elastic member 140 elastically pushes the second moving mold 113 away from the first moving mold 111.

When the core mold 120 retreats, an empty space S is formed by as much as a retreat distance and decreases the pressure and temperature so as to minimize a glittering phenomenon caused by a surface of the fabric 20 being pushed by a high pressure/temperature.

The retreat distance of the core mold 120 is controlled by the decompression releasing distance stopper 160.

When the injection machine pulls the moving mold 110 further back, the second moving mold 113 is divided into the second moving mold a 114 and the second moving mold b 115 as shown in FIG. 2E such that the second moving mold b 115 is minutely released d' from the second moving mold a 114 without any restriction.

The minute releasing d' absorbs a deviation in a decompression releasing distance of the injection machine.

When a resin is completely injection-molded to be integrated with a rear surface of the fabric 20, the dividable moving mold 110 is pulled by the flange 151 and completely released from the fixed mold 130 after cooling as shown in FIG. 2F and then a molded product is withdrawn from the fixed mold 130.

Second Embodiment

Figure 3:
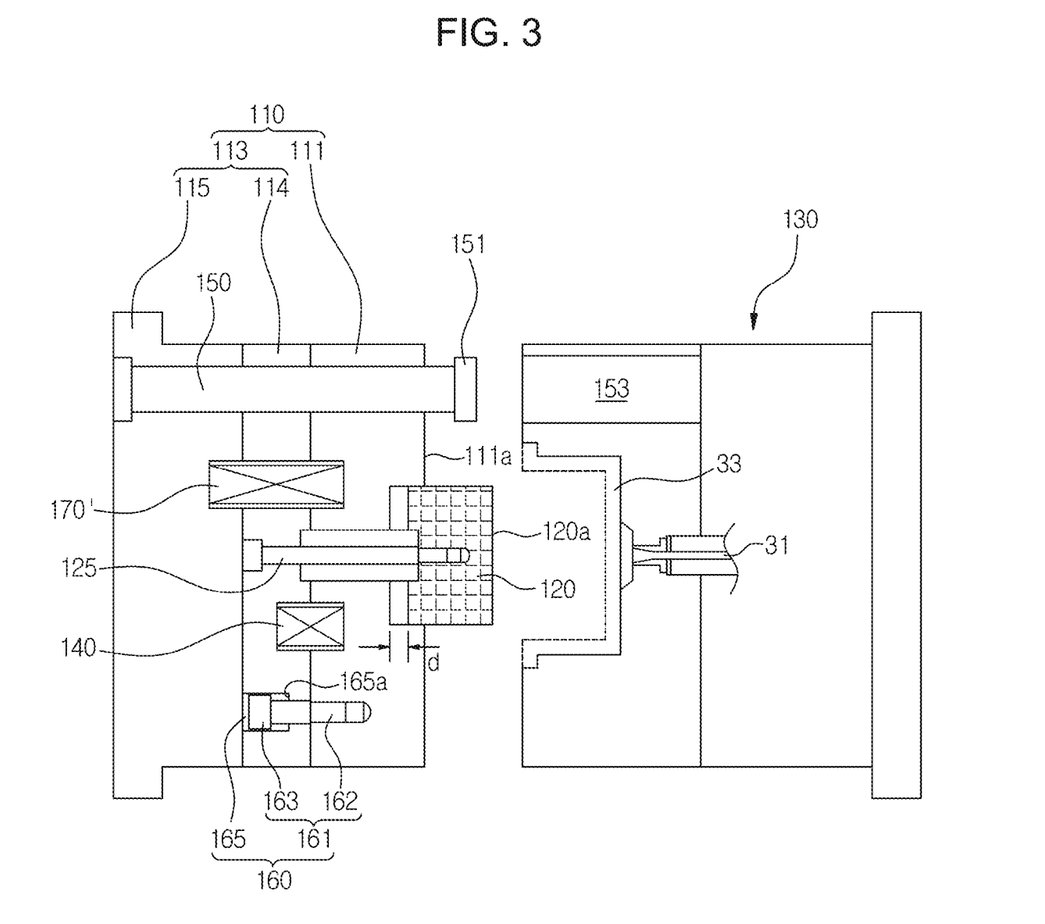
FIG. 3 is a schematic cross-sectional view of an apparatus for forming interior material of a vehicle according to a second embodiment of the present invention.

FIG. 3 is a schematic cross-sectional view of an apparatus for forming interior material of a vehicle according to a second embodiment of the present invention, and FIGS. 4A to 4F are schematic process drawings illustrating a method of forming interior material of a vehicle using the apparatus of FIG. 3.

The apparatus for forming interior material of a vehicle according to the second embodiment of the present invention has a structure and a function which are similar to those of the first embodiment but has a difference that a close contact maintenance member of the second embodiment includes a close contact maintenance elastic member 170' instead of the close contact maintenance holding member 170 of the first embodiment.

That is, the close contact maintenance elastic member 170' is installed between the first moving mold 111 and the second moving mold b 115 as shown in FIG. 3 and applies an elastic force in a direction in which the first moving mold 111 breaks away from the second moving mold b 115.

When the core mold 120 is pressurized by the fixed mold 130 and retreats, the first moving mold 111 maintains a stable pressed state using the elastic force and simultaneously reduces a deviation in a decompression releasing distance of an injection machine by minutely releasing the second moving mold b 115.

A through hole, through which the close contact maintenance elastic member 170' passes, is formed in the second moving mold a 114.

Hereinafter, a method of forming interior material using the apparatus for forming interior material of a vehicle according to the second embodiment will be described with reference to FIGS. 4A to 4F.

Figure 4:
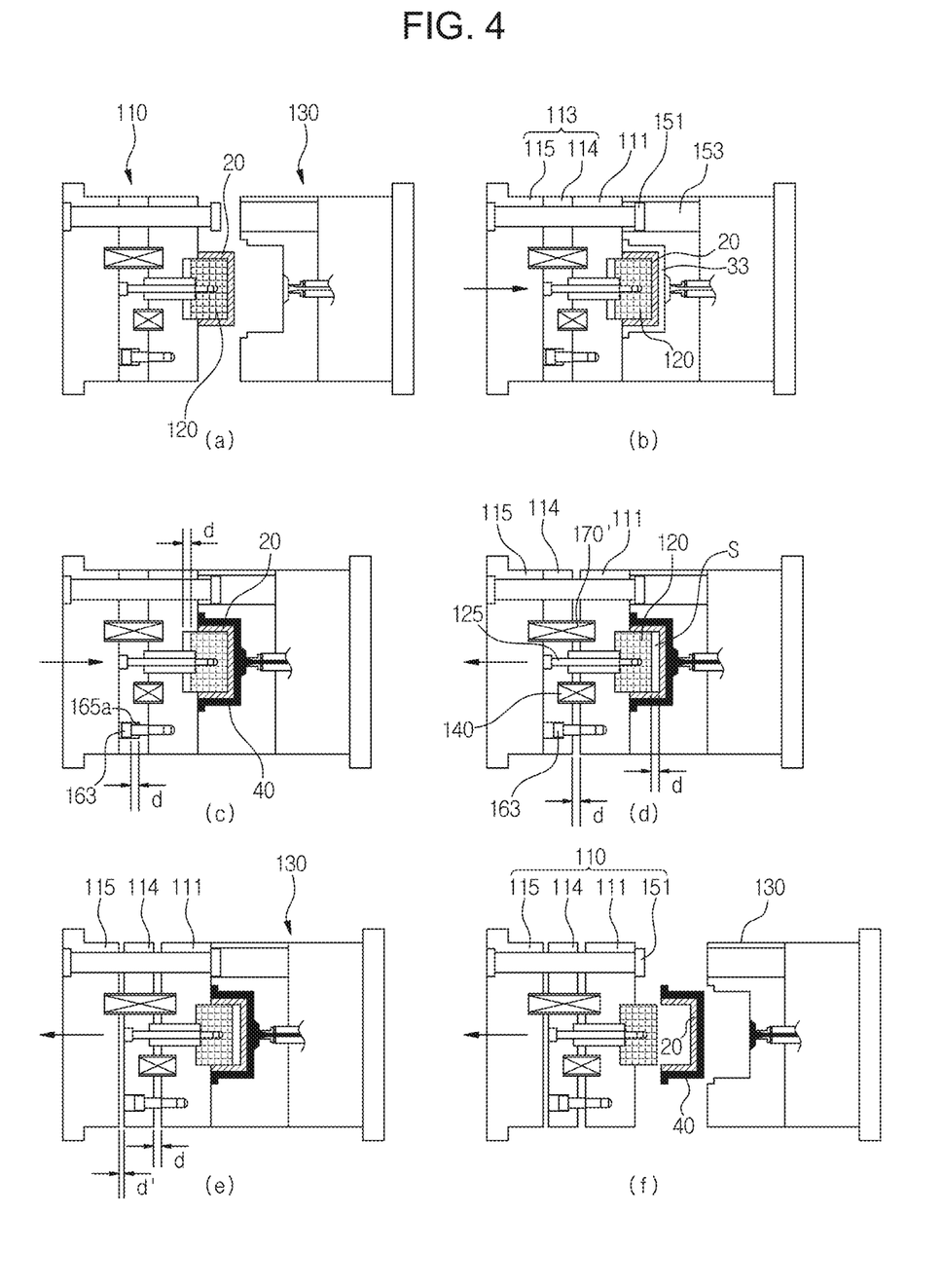
FIG. 4 is schematic process drawings illustrating a method of forming interior material of a vehicle using the apparatus of FIG. 3.

First, when the first moving mold 111 is released from the fixed mold 130 as shown in FIG. 4A, the fabric 20 is placed as an insert onto a perimeter of the core mold 120 of the first moving mold 111.

In the embodiment, the fabric 20 is a high-sensitivity felt including woven fabric and non-woven fabric.

In the case of the high-sensitivity felt, it is necessary to apply close-contact injection molding. This is because a pressure of injection in a pressed state is very high and only fabric can endure the pressure. When an existing epidermic material with napping or a foaming layer in a pressed state, since the napping or the foaming layer cannot endure the pressure, the high-sensitivity felt is injected in a released state and then compression-molded in a pressed state.

Also, the fabric 20 may be fixed by a variety of methods using a pin, vacuum, clamp, and the like.

A pre-forming process is used when the fabric 20, which is placed, has a deep-drawn shape, and a pre-forming process is not used when the fabric 20 has a shape close to a flat surface.

When the fabric 20 is placed as an insert onto the core mold 120 as shown in FIG. 4A, the dividable moving mold 110 and the fixed mold 130 come into close contact with each other as shown in FIG. 4B and preparation for injection is completed.

When the first moving mold 111 of the dividable moving mold 110 finishes pressing against the fixed mold 130 as shown in FIG. 4B, the cavity 33 is filled with a resin through the resin inlet 31 as shown in FIG. 4C.

When the cavity 33 is completely filled with the resin as shown in FIG. 4C, the core mold 120 retreats from the first moving mold 111 as shown in FIG. 4D in order to minimize an influence of the pressure of the fabric 20 and a temperature of the resin. Since only the core mold 120 retreats while the close contact between the first moving mold 111 and the fixed mold 130 is stably maintained by the close contact maintenance elastic member 170', the injected resin does not leak from a part where the first moving mold 111 is pressed against the fixed mold 130.

The retreating of the core mold 120 is performed by the decompression releasing elastic member 140.

That is, the decompression releasing elastic member 140 elastically pushes the second moving mold 113 away from the first moving mold 111.

When the core mold 120 retreats, an empty space S is formed by as much as a retreat distance and decreases the pressure and temperature so as to minimize a glittering phenomenon caused by a surface of the fabric 20 being pushed by a high pressure/temperature.

The retreat distance of the core mold 120 is controlled by the decompression releasing distance stopper 160.

When the injection machine pulls the moving mold 110 further back, the second moving mold 113 is divided into the second moving mold a 114 and the second moving mold b 115 as shown in FIG. 4E such that the second moving mold b 115 is minutely released d' from the second moving mold a 114 by the elastic force of the close contact maintenance elastic member 170'.

The minute releasing d' absorbs a deviation in a decompression releasing distance of the injection machine.

When a resin is completely injection-molded to be integrated with a rear surface of the fabric 20, the dividable moving mold 110 is pulled by the flange 151 and completely released from the fixed mold 130 after cooling as shown in FIG. 4F and then a molded product is withdrawn from the fixed mold 130.

Hereinafter, a method of forming interior material using the apparatus for forming interior material of a vehicle according to the first embodiment will be described with reference to FIGS. 2A to 2F.

First, when the first moving mold 111 is released from the fixed mold 130 as shown in FIG. 2A, the fabric 20 is placed as an insert onto a perimeter of the core mold 120 of the first moving mold 111.

In the embodiment, the fabric 20 is a high-sensitivity felt including woven fabric and non-woven fabric.

In the case of the high-sensitivity felt, it is necessary to apply close-contact injection molding. This is because a pressure of injection in a pressed state is very high and only fabric can endure the pressure. When an existing epidermic material with napping or a foaming layer is injected in a pressed state, since the napping or the foaming layer cannot endure the pressure, the high-sensitivity felt is injected in a released state and then compression-molded in a pressed state.

Also, the fabric 20 may be fixed by a variety of methods using a pin, vacuum, clamp, and the like.

A pre-forming process is used when the fabric 20, which is placed, has a deep-drawn shape, and a pre-forming process is not used when the fabric 20 has a shape close to a flat surface.

When the fabric 20 is placed as an insert onto the core mold 120 as shown in FIG. 2A, the dividable moving mold 110 and the fixed mold 130 come into close contact with each other as shown in FIG. 2B and preparation for injection is completed.

Here, as the protruding bar 171 of the first moving mold 111 is inserted into the groove 173 of the fixed mold 130, the holding groove 171a is mechanically held by the held protrusion 173a.

When the first moving mold 111 of the dividable moving mold 110 finishes pressing against the fixed mold 130 as shown in FIG. 2B, the cavity 33 is filled with a resin through the resin inlet 31 as shown in FIG. 2C.

Figure 5:
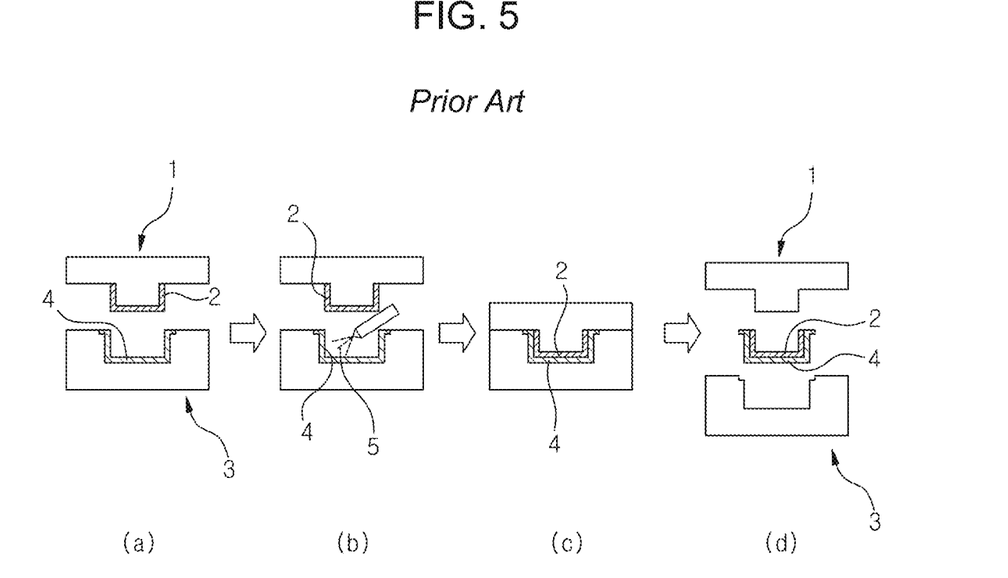
FIG. 5 is schematic process drawings illustrating a conventional apparatus and method of forming interior material of a vehicle.

When the cavity 33 is completely filled with the resin as shown in FIGS. 2C and 5, the core mold 120 retreats from the first moving mold 111 as shown in FIG. 2D in order to minimize an influence of the pressure of the fabric 20 and a temperature of the resin. Since only the core mold 120 retreats while the close contact between the first moving mold 111 and the fixed mold 130 is stably maintained by the close contact maintenance holding member 170, the injected resin does not leak from a part where the first moving mold 111 is pressed against the fixed mold 130.

The retreating of the core mold 120 is performed by the decompression releasing elastic member 140.

That is, the decompression releasing elastic member 140 elastically pushes the second moving mold 113 away from the first moving mold 111.

When the core mold 120 retreats, an empty space S is formed by as much as a retreat distance and decreases the pressure and temperature so as to minimize a glittering phenomenon caused by a surface of the fabric 20 being pushed by a high pressure/temperature.

The retreat distance of the core mold 120 is controlled by the decompression releasing distance stopper 160.

When the injection machine pulls the moving mold 110 further back, the second moving mold 113 is divided into the second moving mold a 114 and the second moving mold b 115 as shown in FIG. 2E such that the second moving mold b 115 is minutely released d' from the second moving mold a 114 without any restriction.

The minute releasing d' absorbs a deviation in a decompression releasing distance of the injection machine.

When a resin is completely injection-molded to be integrated with a rear surface of the fabric 20, the dividable moving mold 110 is pulled by the flange 151 and completely released from the fixed mold 130 after cooling as shown in FIG. 2F and then a molded product is withdrawn from the fixed mold 130.

Although the embodiments according to the concept of the present invention have been described above in detail, the embodiments may be variously changed and may have a variety of shapes and are not restricted by particularly disclosed shapes and include all changes, equivalents, and substitutes which are included in the concept and technical scope of the present invention.

The invention claimed is:

1. An apparatus for forming interior material of a vehicle, the apparatus comprising:
   a fixed mold;
   a dividable moving mold comprising a first moving mold, in which a core mold is slidably installed, and a second moving mold which faces the first moving mold, wherein the first moving mold is pressed against the fixed mold, and a woven fabric or a non-woven fabric is placed on the core mold as an insert; wherein the second moving mold comprises a second moving mold a, which faces the first moving mold, and a second moving mold b, which faces the second moving mold a,
   a core mold rod whose one end is fixed to the second moving mold and the other end is fixed to the core mold;
   a decompression releasing elastic member installed between the first moving mold and the second moving mold; and
   a space formed in a rear side of the core mold due to a retreat by the decompression releasing elastic member, wherein the decompression releasing elastic member pulls the core mold back by a decompression releasing distance, and the second moving mold is pushed away from the first moving mold.

2. The apparatus of claim 1, further comprising: a decompression releasing distance stopper which restricts the decompression releasing distance of the second moving mold from the first moving mold; and a puller rod whose one end is fixed to the second moving mold and the other end is disposed in a groove formed in the fixed mold.

3. The apparatus of claim 2, wherein the decompression releasing distance stopper comprises a bolt installed in the first moving mold and a bolt sliding groove formed in the second moving mold, and wherein a shaft portion of the bolt is fastened and fixed to the first moving mold, and a stepped head of the bolt is held by a holding lip of the bolt sliding groove while being disposed in the bolt sliding groove.

4. The apparatus of claim 3,
wherein the one end of the core mold rod is fixed to the second moving mold a,
wherein the one end of the puller rod is fixed to the second moving mold b, and
wherein the decompression releasing elastic member and the decompression releasing distance stopper are installed between the first moving mold and the second moving mold a.

5. The apparatus of claim 4, further comprising a close contact maintenance member which maintains pressure between the first moving mold and the fixed mold.

6. The apparatus of claim 5, wherein the close contact maintenance member is a close contact maintenance holding member which comprises a protruding bar having a holding groove formed in the first moving mold and which comprises a held protrusion formed around the groove of the fixed mold to be held by the holding groove when the protruding bar is inserted into the groove of the fixed mold, and wherein a holding force of the close contact maintenance holding member is less than a withdrawal force of the first moving mold.

7. The apparatus of claim 5, wherein the close contact maintenance member is a close contact maintenance elastic member which is installed between the first moving mold and the second moving mold b.

* * * * *